(12) United States Patent
Ranta

(10) Patent No.: US 6,775,259 B1
(45) Date of Patent: Aug. 10, 2004

(54) METHOD AND A DEVICE TO UTILISE THE CHANNELS OF A CELLULAR SYSTEM

(75) Inventor: Jukka Tapio Ranta, Salo (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/222,607

(22) Filed: Dec. 29, 1998

(30) Foreign Application Priority Data

Jan. 5, 1998 (FI) .................................................. 980014
Jul. 27, 1998 (FI) .................................................. 981663

(51) Int. Cl.[7] .............................................. H04Q 7/28
(52) U.S. Cl. ........................ 370/341; 370/340; 370/310
(58) Field of Search ............................... 370/341, 342, 370/343, 347, 336, 331, 311, 337, 321, 322, 326; 455/403, 422, 424, 425, 436, 442

(56) References Cited

U.S. PATENT DOCUMENTS

| | | | |
|---|---|---|---|
| 4,527,284 A | * 7/1985 | Rottger ........................ 455/436 |
| 4,850,033 A | 7/1989 | Eizenhofer et al. ............ 455/56 |
| 5,042,082 A | 8/1991 | Dahlin ......................... 455/33 |
| 5,081,704 A | 1/1992 | Umeda et al. ................. 455/33 |
| 5,396,653 A | 3/1995 | Kivari et al. .................. 455/88 |
| 5,430,740 A | 7/1995 | Kivari et al. ............... 371/37.1 |
| 5,442,809 A | 8/1995 | Diaz et al. .................. 455/54.1 |
| 5,446,364 A | 8/1995 | Naskali .......................... 320/2 |
| 5,502,721 A | 3/1996 | Pohjakallio ................ 370/60.1 |
| 5,511,110 A | 4/1996 | Drucker ........................ 379/57 |
| 5,537,395 A | 7/1996 | Alles et al. .................... 370/17 |
| 5,539,748 A | * 7/1996 | Raith ........................... 370/329 |
| 5,570,353 A | 10/1996 | Keskitalo et al. ............. 370/18 |
| 5,570,369 A | * 10/1996 | Jokinen ....................... 370/311 |
| 5,577,024 A | 11/1996 | Malkamaki et al. .......... 370/18 |
| 5,606,548 A | 2/1997 | Vayrynen et al. ........... 370/252 |
| 5,625,274 A | 4/1997 | Naskali ........................ 320/23 |
| 5,625,629 A | 4/1997 | Wenk .......................... 370/347 |
| 5,648,711 A | 7/1997 | Hakkarainen ................... 320/2 |
| 5,708,656 A | 1/1998 | Noneman et al. ............ 370/320 |
| 5,726,981 A | 3/1998 | Ylitervo et al. ............. 370/332 |
| 5,745,503 A | 4/1998 | Kuusinen .................... 371/37.1 |

(List continued on next page.)

FOREIGN PATENT DOCUMENTS

| | | |
|---|---|---|
| EP | 0415502 A2 | 6/1991 |
| EP | 0 762 788 A2 | 3/1997 |
| EP | 0 796 025 A2 | 9/1997 |
| WO | WO 94/08432 | 4/1994 |
| WO | WO 95/12936 | 5/1995 |
| WO | WO 95/19687 | 7/1995 |
| WO | WO 95/26112 | 9/1995 |
| WO | WO 95/31878 | 11/1995 |
| WO | WO 96/10895 | 4/1996 |
| WO | WO 97/36387 | 10/1997 |

OTHER PUBLICATIONS

ETSI "Digital cellular telecommunications system (Phase 2+); Mobile radio interface layer 3 specification" (GSM 04.08 version 5.4.1).
Finnish Office Action.

*Primary Examiner*—Douglas Olms
*Assistant Examiner*—Ricardo M. Pizarro
(74) *Attorney, Agent, or Firm*—Perman & Green LLP

(57) ABSTRACT

In a cellular system information is transmitted from a base station (100, 400) to a terminal (101, 500). Between the base station and the terminal there is defined a paging channel (110) in order to transmit requests for establishing downlink connections, and a broadcast control channel (108, 109) in order to transmit general information concerning the base station's cell. General information concerning the base station's cell is transmitted on the paging channel (110) when the paging channel's (110) information transmission capacity is higher than the total amount of information which has to be transmitted regarding the requests to establish downlink connections.

24 Claims, 4 Drawing Sheets

U.S. PATENT DOCUMENTS

| | | | |
|---|---|---|---|
| 5,760,568 A | 6/1998 | Naskali | 320/5 |
| 5,764,632 A | 6/1998 | Ylitervo | 370/337 |
| 5,790,534 A | 8/1998 | Kokko et al. | 370/335 |
| 5,794,156 A | 8/1998 | Alanara | 455/517 |
| 5,802,465 A * | 9/1998 | Hamalainen et al. | 455/403 |
| 5,821,735 A | 10/1998 | Scharff | 320/125 |
| 5,878,038 A * | 3/1999 | Willey | 370/335 |
| 5,920,547 A | 7/1999 | Werth | 370/280 |
| 6,108,325 A | 8/2000 | Stephanson et al. | 370/337 |
| 6,108,550 A | 8/2000 | Wiorek et al. | 455/447 |
| 6,137,772 A | 10/2000 | Turcotte et al. | 370/29 |
| 6,226,279 B1 | 5/2001 | Hansson et al. | 370/329 |
| 6,418,127 B1 * | 7/2002 | Laurent | 370/311 |

* cited by examiner

METHOD AND A DEVICE TO UTILISE THE CHANNELS OF A CELLULAR SYSTEM

TECHNICAL FIELD

The invention relates generally to the arrangement of telecommunication on the channels between base stations and terminals of a cellular system. Particularly the invention relates to an efficient utilisation of the communication capacity contained in the channels.

BACKGROUND OF THE INVENTION

According to the official definition by CCITT (Comité Consultatif International Téléphonique et Télégraphique) a "channel" is an identified portion of an interface. In cellular systems the radio interface between a base station and the terminals contains several channels. Of these channels the downlink paging channel, the broadcast control channel, and the cell broadcast channel are the essential channels regarding this invention. A known embodiment of these channels in the GSM system (Global System for Mobile telecommunications) is described below in order to clarify the background of the invention.

In the GSM system the radio interface is divided into frequency bands with a width of 200 kHz, which in the time direction is divided into time slots with a length of 0.577 ms, and the information is transmitted as bursts in these time slots. The definition of a certain channel represents the indication of those time slots which can transmit information belonging to said channel. The Paging CHannel (PCH) and the Access Grant CHannel (AGCH) create a PAGCH entity, where the proportions of the PCH and the AGCH will vary with time. The Broadcast Control CHannel (BCCH) is a channel of its own. The time slots used by the BCCH and the PAGCH are defined as follows: at the so called Common Control CHannel (CCCH) frequency of the cell there are taken 51 successive frames each formed by eight successive time slots, and from each frame the first time slot is taken. The time slots obtained in this way are numbered from 0 to 51. Then the time slots 2 to 5 belong to the BCCH and the time slots 6 to 9, 12 to 15, 16 to 19, 22 to 25, 26 to 29, 32 to 35, 36 to 39, 42 to 45 and 46 to 49 belong the PAGCH, if the so called full rate PAGCH is used. A PAGCH of the one third rate comprises only the time slots 6 to 9, 12 to 15 and 16 to 19.

The Cell Broadcast CHannel (CBCH) can be located on the same frequency together with the BCCH and the PAGCH, or on another frequency, or it can even use frequency hopping. It is defined so that when one examines eight successive periods of 51 frames, having a total length of about 2 seconds, then the CBCH during this period comprises four groups formed by four time slots. Regarding the time slots used by the PAGCH the time slots used by the CBCH are located so that there is always a time difference of at least a certain minimum length between a burst transmitted in a time slot belonging to the CBCH and the burst which belongs to a paging message and which is transmitted in a time slot belonging to the PAGCH, so that a terminal can receive both the bursts transmitted through the CBCH and the paging messages. The arrangement of the time slots used by BCCH, PAGCH and CBCH is described in more detail for instance in the book Michel Mouly, Marie-Bernadette Pautet: "The GSM System for Mobile Communications", published by the authors, ISBN 2-9507190-0-7, Palaiseau 1992.

All terminals in a certain cell do not receive all paging messages transmitted on the PAGCH, but the terminals have been divided into so called paging groups, and the paging messages transmitted to these groups have a certain schedule within the PAGCH. When a terminal is in the idle mode its receiver is always active and tuned to the CCCH frequency when its paging group has a scheduled paging message transmission time. Further the receiver of a terminal is always active and tuned to the CCCH frequency during the BCCH and the CBCH.

When the receiver of a terminal is on it consumes energy. The receiver should be on as little of the time as possible, so that the charge of the terminal's battery could last longer.

SUMMARY OF THE INVENTION

The object of the invention is to present a method with which the electric power consumption of a terminal's receiver can be reduced in the idle mode, compared to prior art. An object of the invention is also to present devices for using the method according to the invention.

The object of the invention is achieved so that information, which usually is transmitted on the broadcast control channel and on the cell broadcast channel, is placed in unoccupied parts of the paging channel.

The method according to the invention is applicable in a cellular system, where between a base station and a terminal there is defined a paging channel for transmitting the requests for establishing downlink connections, and a broadcast control channel for transmitting general information concerning the cell of the base station. The method according to the invention is characterised in that general information concerning the base station's cell are transmitted on the paging channel when the paging channel's data transmission capacity is higher than the total amount of data which has to be transmitted concerning the requests to establish downlink connections.

The invention relates also to a cellular system base station which is characterised in that it comprises means for transmitting general information on the paging channel concerning the base station's cell.

Further the invention relates to a cellular system terminal which is characterised in that it comprises means for receiving general information on the paging channel concerning the base station's cell.

The paging channel comprises certain time slots (more generally: certain time periods on a certain frequency), during which the terminals must be in the receiving mode, regardless of whether or not the base station in fact has paging messages to be transmitted. According to the invention the base station can transmit other information in those parts of the paging channel, which otherwise would be unoccupied due to the low number of paging messages to be transmitted. The other information is preferably that information, which normally is transmitted on the broadcast control channel and/or on the cell broadcast channel. When the terminal receives on the paging channel information, which belongs to the broadcast control channel and/or to the cell broadcast channel, then it is not necessary for it to receive the same information again on the proper broadcast control channel and/or on the cell broadcast channel, but it can switch its receiver off for the time of the transmission of other channels, and thus it can save power.

Power saving in a base station is not as essential as in the terminals, so a base station can quite well transmit the same information both in the unoccupied parts of the paging channel and on the broadcast control channel and/or on the cell broadcast channel.

BRIEF DESCRIPTION OF THE DRAWINGS

The invention is described in more detail below with reference to preferred embodiments presented as examples, and to the enclosed figures, in which.

DETAILED DESCRIPTION OF THE INVENTION

Figure 1:
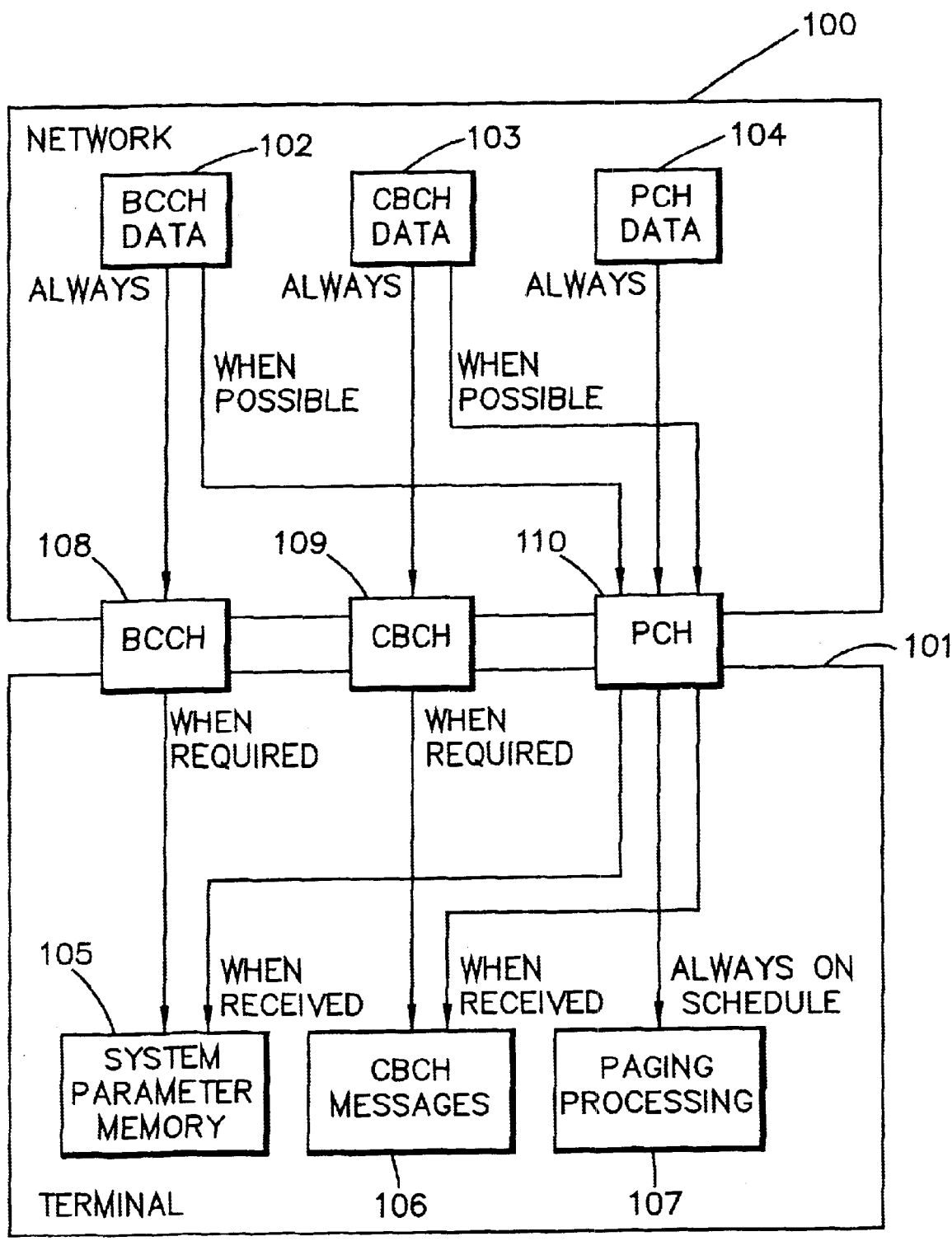
FIG. 1 shows the principle of the invention.

In FIG. 1 the block 100 represents generally the stationary parts or the "network" of a cellular system, and the block 101 represents a terminal. The network 100 contains a functional part 102, which generates transmission control data called BCCH data in connection with the GSM system. In the same way the network 100 has a functional part 103, which generates broadcast transmission data or CBCH data, and a functional part 104, which generates paging messages or PCH data. In the terminal 101 there is a system parameter memory 105, which stores the received BCCH data. Further the terminal 101 has for the broadcast transmissions a presentation section 106, which presents the CBCH information messages to the terminal's user, and a paging message processing block 107, which examines whether a received paging message is intended for this terminal, and if so, then it initiates in the terminal the functions for establishing the connection required by an incoming call. The network 100 and the terminal 101 are connected by three channels 108, 109 and 110, which comply with the specifications of the cellular system in question. In the GSM system the BCCH channel 108, the CBCH channel 109 and the PCH channel 110 are formed by certain time slots, which according to the definition are cyclically repeated on the CCCH frequency, as was mentioned above in the description of prior art.

In the network 100 there is always a direct connection from each functional part 102, 103 and 104 to a corresponding channel 108, 109 and 110, so that the data generated by each functional part 102, 103 and 104 is transmitted in a channel belonging to that part. On the other hand there is also a connection to the PCH channel 110 from the functional parts 102 and 103 generating the BCCH data and the CBCH data, but these connections are conditional: the BCCH data and/or the CBCH data are transmitted on the PCH channel only when there is unoccupied space, or when the paging messages generated by the PCH part 104 do not occupy all the space on the PCH channel 110.

In the terminal 101 there is a connection from the PCH channel 110 to the paging message processing block 107. Further there is a conditional connection from the PCH channel 110 to the system parameter memory 105 and to the broadcast transmission presentation section 106, so that the data intended for these and received on the PCH channel can be directed to the correct address. The connections from the BCCH channel 108 to the system parameter memory 105 and from the CBCH channel 109 to the broadcast transmission presentation section 106 are also conditional, or they are used only when the blocks 105 and 106 have not received the required data through the PCH channel 110.

Figure 2:
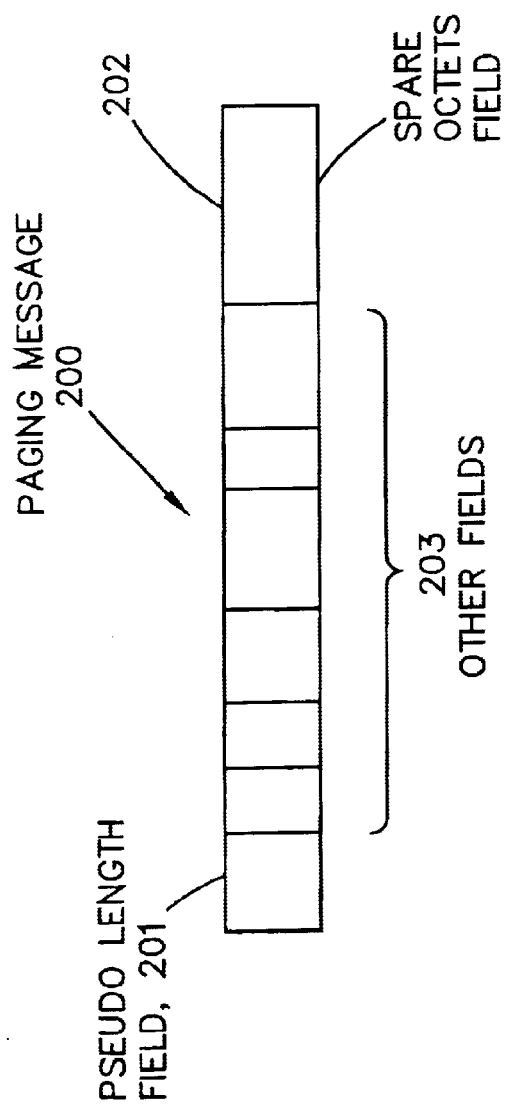
FIG. 2 shows the structure of a paging message known per se.

FIG. 2 shows the paging message as defined in the GSM system standard no. GSM 04.08. The first field of the paging message 200 is a so called pseudo length field 201 having the length of one octet or eight bits. The pseudo length value in the field 201 represents the sum of the lengths of the other fields 203 between the first field 201 and the last field 202 of the paging message, expressed in octets. The other fields 203 are not essential for the invention, and their total length, or the value of the pseudo length, can vary between 5 and 22 octets. The last field 202 is the so called spare octets field, and its length is determined by the fact, that the sum of the last field and the pseudo length value in field 201 must be 22 octets. In other words, the length of the spare octets field 202 can be any integer number of octets between zero and 17 octets, these values included.

The above mentioned field lengths are particularly related to a paging message of the so called type 1. The standard GSM 04.08 also defines paging messages of types 2 and 3, which differ from a paging message of type 1 regarding the lengths and the use of the fields. However, also they include a spare octets field which can be used in a manner according to the embodiment of the invention described below.

The use of the spare octets field 202 in the GSM standard 04.08 is left to future extensions of the system. The invention is one such extension. According to prior art a base station could transmit a paging message according to FIG. 2 which in the fields 203 contains five octets of actual data, and in field 202 seventeen octets of stuffing bits, i.a. unoccupied space. According to the first embodiment of the invention the unoccupied space in the field 202 can be utilised by transmitting such data in it, which normally would be transmitted on the BCCH channel or on the CBCH channel.

If the spare octets field 202 of a certain paging message contains information belonging to other channels, then an identifier indicating this fact must be included in said paging message, so that the terminals can know about it. One possibility to create an identifier is to use the Message Type field contained in the fields 203, but the Message Type field having a length of one octet is not particularly shown in the figure. With eight bits it is possible to define unequivocally 256 messages of different types, but at the moment when this patent application is written the standard GSM 04.08 reserves only less than 100 values of the Message Type field to indicate messages of certain types (for instance the value 00100001 represents a paging message of type 1, the value 00100010 represents a paging message of type 2, the value 00100100 represents a paging message of type 3, and the value 00100111 represents an answer to a paging message). A value of the Message Type field which is not yet reserved can be reserved to indicate a paging message whose spare octets field contains information, which normally would belong to the BCCH channel. Another still unreserved value of the Message Type field can be reserved to represent a paging message whose spare octets field contains information, which normally would belong to the CBCH channel.

Another possibility to define a paging message identifier, which indicates that the spare octets field contains information belonging to other channels, is to use the extra capacity included in the field 201. The maximum pseudo length of the paging message is 22 octets, so that the maximum value of the field 201 is the binary number 00010110 representing the decimal system number 22. Thus the three most significant bits of the field 201 in the prior art paging messages are always zeroes. In order to use them in the manner according to the invention it is possible to define for instance that the most significant bit of the field 201 is 1, if the spare octets field contains information which normally would belong to the BCCH channel, and that the second most significant bit of the field 201 is 1, if the spare octets field contains information which normally would belong to the CBCH channel.

Figure 3:
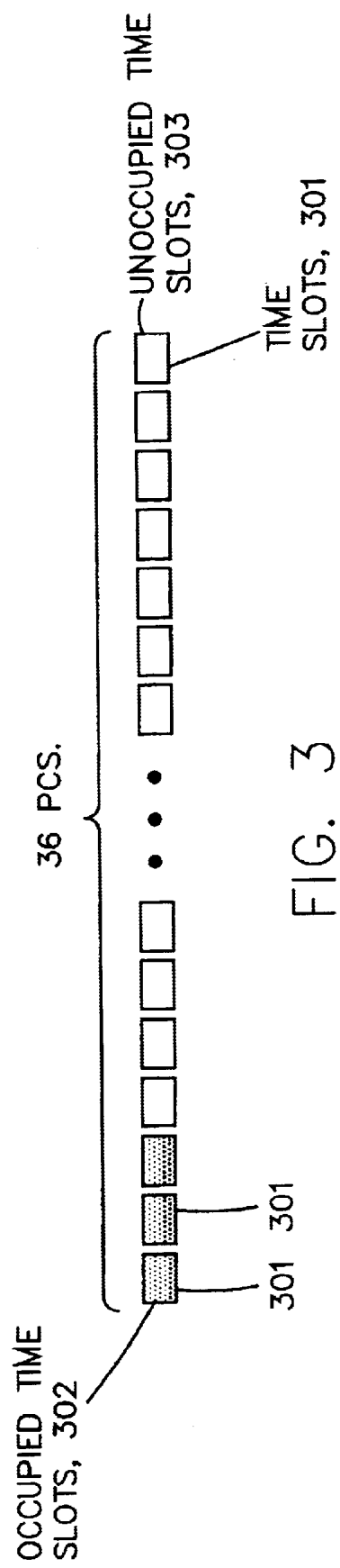
FIG. 3 shows how the paging messages are located in the paging channel.

FIG. 3 shows schematically the time slots 301 which belong to the paging channel, and for instance in a full rate PAGCH channel of the GSM system there are 36 such time slots in 51 consecutive frames. The number of downlink paging messages and the number of capacity allocation messages transmitted as answers to uplink paging messages from the terminals will vary depending on how often the users call each other. During a quiet period it may happen that only a few time slots of the 36 slots contain a paging message or a capacity allocation message. These "occupied" time slots 302 are shown as grey slots in the figure. It can even happen that several of the 51 frames are used so that the base station does not transmit any paging messages or capacity allocation messages at all. Then the most part of the time slots 301 are unoccupied time slots 303, which are shown as white slots in the figure. According to another embodiment of the invention the base station can transmit in these unoccupied time slots messages, which are similar to those which it according to prior art transmits on the BCCH and CBCH channels. This embodiment can be an alternative to the use of the spare octets fields shown in FIG. 2, or both embodiments can be used simultaneously. The use of the unoccupied time slots provides the advantage compared to the use of the spare octets fields, that there is no need to define a new message to be separately identified, but it is possible to use prior art messages known per se, which only are transmitted on a different channel than in a prior art system.

Figure 4:
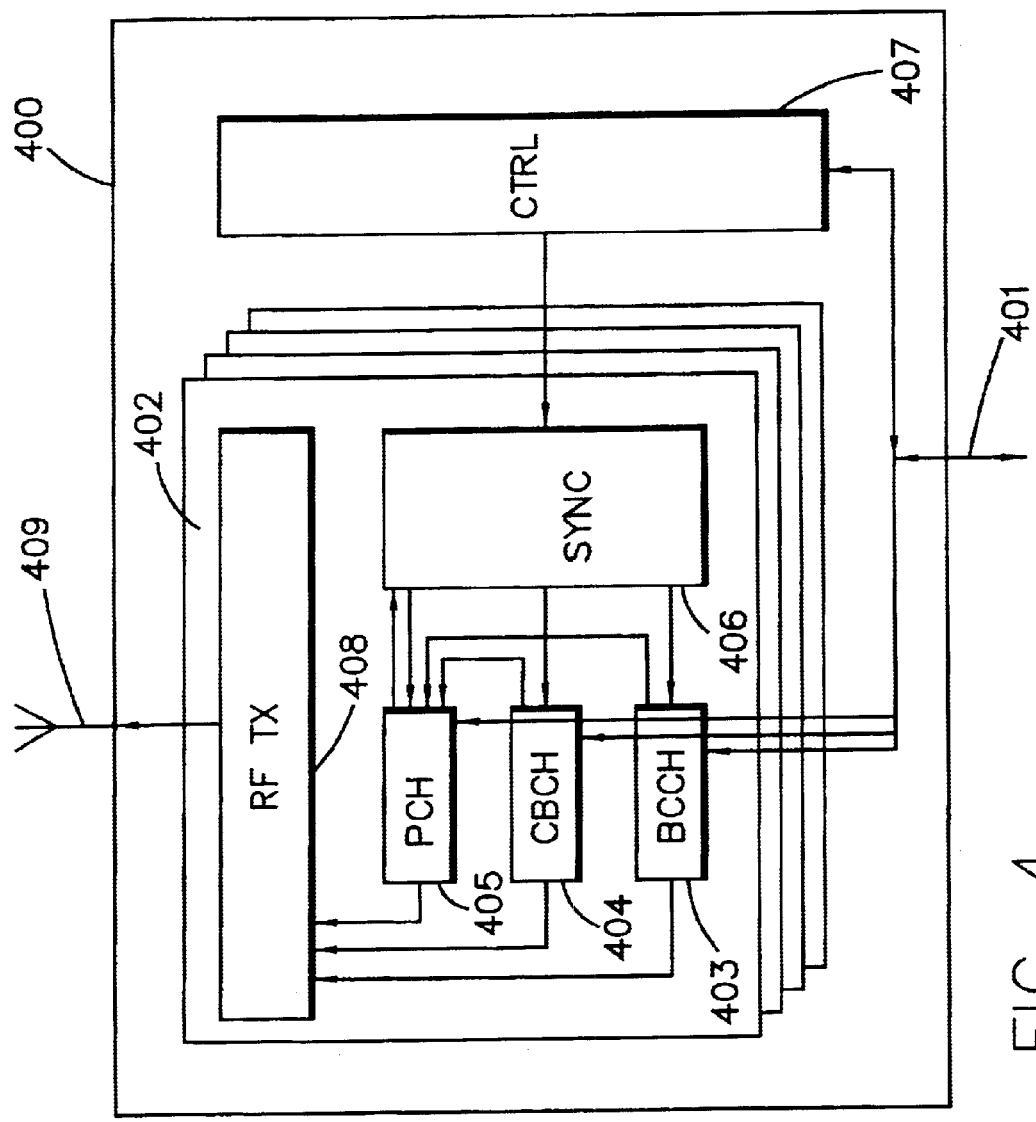
FIG. 4 shows a cellular system's base station according to the invention.

FIG. 4 shows schematically a base station 400 of a cellular system, which in a manner known per se communicates with other parts of the network via a duplex communication link 401. The base station 400 comprises parallel transmission sections 402 in order to generate simultaneous transmissions on different frequencies. One of the transmitter sections 402 is the transmitter section of the cell's common control frequency or the CCCH frequency, and it comprises a BCCH section 403, a CBCH section 404 and a PCH section 405 as well as a timing section 406, which controls their mutual timing and which for the timing receives synchronisation information from the common control block 407 of the base station. Each of the sections 403, 404 and 405 generate messages, according to the specifications relating to the respective own channel. In an order determined by the timing section 406 each of the sections 403, 404 and 405 in its turn is switched to the radio frequency section 408, which performs the required modulations and up-conversions in order to convert the transmitted messages into a CCCH frequency signal, which is supplied to the transmission antenna 409. For the operation according to the first embodiment of the invention there are connections from the BCCH section 403 and from the CBCH section 404 to the PCH section, so that the information which normally is transmitted on the BCCH or CBCH can be placed in the spare octets of the paging messages generated in the PCH section. The second embodiment of the invention requires that the timing section 406 is programmed so that it enables the connection of the BCCH section 403 or the CBCH section 404 to the radio frequency section 408 when the PCH section 405 does not contain paging messages to be transmitted in all PCH time slots. From the PCH section 405 to the timing section 406 there may be a connection, through which the PCH section can indicate when there is extra space in the PCH. Alternatively the BCCH section 403 and the CBCH section 404 can continuously provide data to the PCH section 405, whereby the PCH section 405 only ignores these data if there is not sufficiently space in the PCH to transmit these data. Of course the base station can contain a plurality of other sections which are not shown in FIG. 4.

Figure 5:
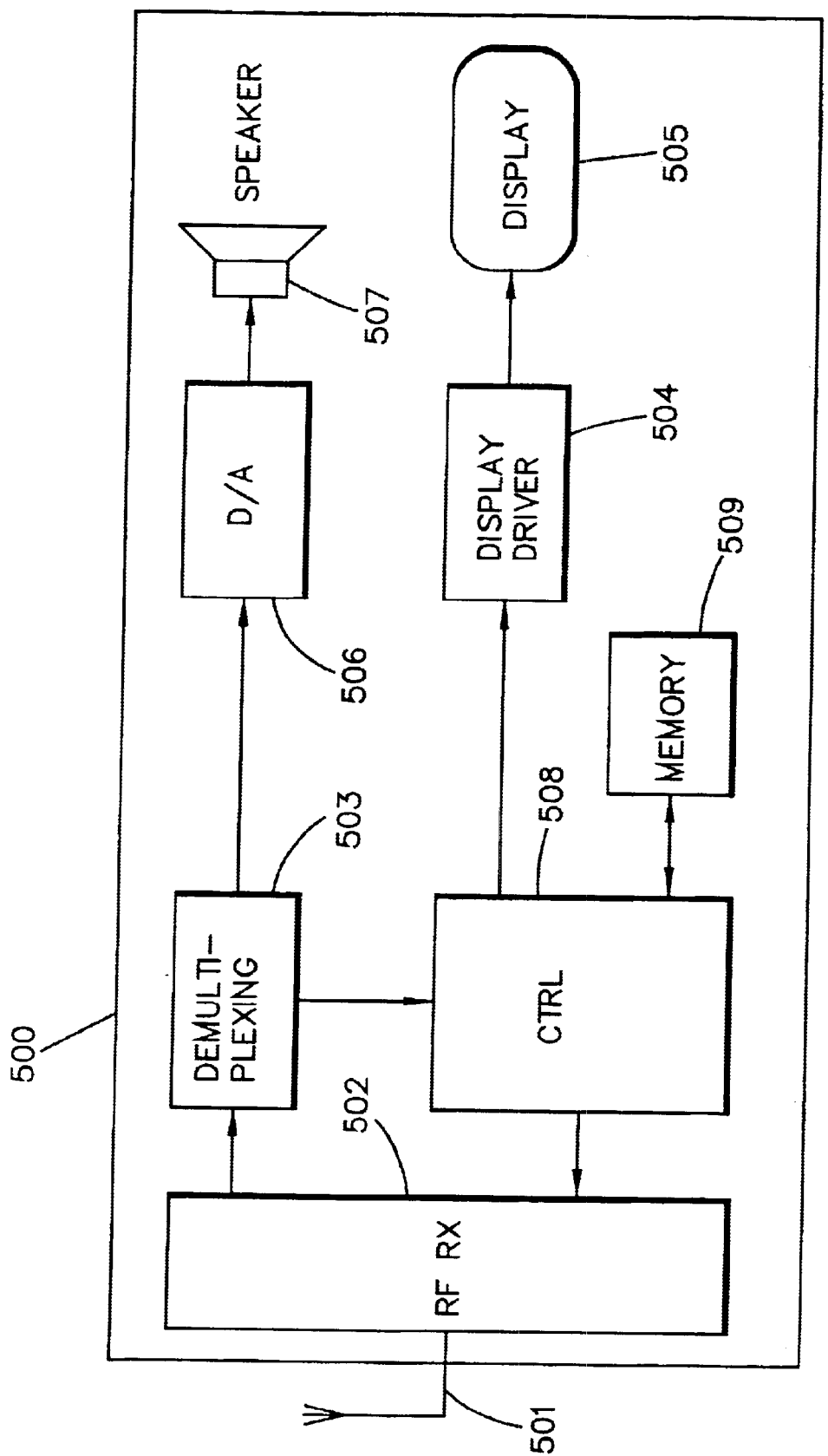
FIG. 5 shows a cellular system's terminal according to the invention.

FIG. 5 shows schematically a cellular system terminal 500, and of the terminal sections the figure shows the antenna 601, the radio frequency section 502, the channel decoding and demultiplexing section 503, the display driver 504 and the display 505, the D/A converter 506 and the speaker 507, and the control block 508. The radio frequency section 502 contains i.a. a receiver, whose activity and reception frequency can be controlled by the control block 508. The channel decoding and demultiplexing section 503 directs the voice signal received during a call via the D/A converter 506 to the speaker 507, and all data signals to the control block 508, from which the text messages received on the CBCH channel are supplied further via the display driver 504 to the display 505. The system parameter transmitted on the BCCH channel are stored by the control block 508 in the memory 509. In prior art operation the control block 508 always switches the receiver in the radio frequency section 502 to receive on a certain CCCH frequency when a BCCH, CBCH or PCH channel is in turn to be transmitted. In addition to the BCCH channel of the own cell the terminal can be prepared for cell reselection by receiving also the BCCH channels of other adjacent cells. Of course the terminal can contain a plurality of other sections which are not shown in FIG. 5, and the presented embodiment is not limiting regarding the invention: in practice the same operations can also be realised in other ways.

To make it possible for the terminal 500 to operate in the manner according to the invention the control block 508 must be programmed so that it detects when the data received on the PCH channel represents a conventional paging message and when the data received on the PCH channel is such data which usually would be received on the BCCH and CBCH channels. Further some criteria must be programmed in the control block 508, on the basis of which criteria the control block can find out that the data which usually is transmitted on the BCCH and/or CBCH channels are received enough on the PCH channel, and that there is thus no need to switch on the receiver during the receiving period of the BCCH or CBCH channels. A programming of this kind is a technique known by a person skilled in the art. When the criteria are defined it is possible to utilise for instance the cyclic nature of the channel definition. Considering a certain period, after which the mutual time schedule of the BCCH, CBCH and PCH channels is repeated in an identical way, the control block 508 can check whether data belonging to the BCCH an/or CBCH channels were received on the PCH channel during the previous corresponding period. If so, it is not necessary during the present period to receive that data from those channels, to which the data belonged and which was received on the PCH channel during the previous period. During each period when the PCH channel is received the control block 508 checks whether it contains data belonging to other channels.

An advantage of the invention can be seen in that during the idle mode the terminal's receiver is required to be switched on a period which is up to 20% shorter, and correspondingly the terminal can therefore be switched on a longer time before its battery must be recharged. The operation according to the invention can be arranged by programming the base station and the terminal to operate in the new way, and it is not necessarily required to touch the realisation of their components known per se, which is advantageous regarding the manufacturing techniques. Further, such terminals, which do not support the operation according to the invention, are still fully usable, even if the base stations would be programmed to operate in the manner according to the invention: the terminals according to the invention simple ignore such messages received on the PCH channel which they do not identify as paging messages intended for them. Correspondingly, a terminal according to the invention can also be used in the cell of a prior art base station, because when the terminal does not receive on the PCH channel information belonging to the BCCH nor CBCH channels, then it receives the information on their own channels according to prior art.

Above we described how the invention is applied mainly to the GSM system. However, it is obvious that the invention is not limited to any certain system, but that it can be applied in all such cellular systems where there is at least periodically unoccupied space on the paging channel, and where information belonging to the other channels is transmitted in parallel with the paging channel. Examples of other cellular systems are the GSM extensions DCS1800 and DCS1900 (Digital Communications System at 1800/1900 MHz), PDC (Personal Digital Cellular), IS-54 and IS-96 (Interim Standard 54/96), and the proposed future cellular system UMTS of the third generation (Universal Mobile Telecommunications System). In this patent application the channel names are only exemplary.

What is claimed is:

1. A method for transmitting information from a base station to a terminal in a cellular radio system, comprising the steps of
    defining a paging channel between the base station and the terminal for transmitting requests for the establishment of downlink connectors, which paging channel has a certain information transmission capacity,
    defining a broadcast channel for transmitting general information concerning the cell of the base station, the broadcast channel being adapted to be in simultaneous use with the paging channel and
    in a situation where the information transmission capacity of the paging channel is higher than the total amount of information which is to be transmitted concerning request to establish downlink connections, transmitting general information concerning the base station's cell on the paging channel at the same time the broadcast channel is transmitting general information concerning the cell of the base station.

2. A method according to claim 1, wherein the general information concerning the cell of the base station is transmitted on the paging channel instead of on the broadcast channel when the paging channel's information transmission capacity is higher than the total amount of information which has to be transmitted concerning requests to establish downlink connections.

3. A method according to claim 1, wherein the general information concerning the cell of the base station is transmitted on the paging channel in addition to the broadcast channel when the paging channel's information transmission capacity is higher than the total amount of information which has to be transmitted concerning requests to establish downlink connections.

4. A method according to claim 1, wherein the general information concerning the cell of the base station is in the otherwise unoccupied parts of the requests for the establishment of downlink connections, which requests are transmitted on the paging channel.

5. A method according to claim 1, wherein the general information concerning the cell of the base station is transmitted on the paging channel in other messages, which are transmitted on the paging channel in addition to the requests for the establishment of downlink connections.

6. A method according to claim 1, wherein
    said cellular system is one of the following: GSM, DCS1800, DCS1900;
    said paging channel is one of the following: PCH, PAGCH; and
    said broadcasting control channel is one of the following: BCCH, CBCH.

7. A base station of a cellular system, comprising
    means for transmitting requests for establishing downlink connections on a paging channel having a certain data transmission capacity,
    means for transmitting general information concerning the base station's cell on a broadcast control channel, and
    means for transmitting general information concerning the base station's cell on the paging channel while the means for transmitting general information concerning the base station's cell on the broadcast channel is substantially simultaneously transmitting on the broadcast channel.

8. A terminal of a cellular system, comprising:
    means for receiving requests for establishing downlink connections on a paging channel having a certain information transmission capacity,
    means for receiving information concerning the base station's cell on a broadcasting control channel and
    means for receiving general information concerning the base station's cell on a broadcast channel while the paging channel is substantially simultaneously transmitting information concerning the base station's cell.

9. A terminal according to claim 8, further comprising a control block and means for receiving information on the paging channel at predetermined intervals, whereby
    a) the control block is arranged to check whether a period longer than a certain predetermined time has passed since information concerning the base station's cell was received the previous time on the paging channel,
    b) the control block is arranged, as a response to a negative result form step a), to temporarily prevent reception of information on the broadcasting control channel.

10. A method for transmitting information from a base station to a terminal in a cellular radio system comprising the steps of:
    determining if unoccupied slots exist in a paging control channel;
    if unoccupied slots exist in the paging channel, coupling a broadcast control channel to the paging control channel; and
    transmitting information normally transmitted on the broadcast control channel in the unoccupied slots of the paging channel.

11. The method of claim 10 further comprising the step, if the paging control channel does not have an adequate number of unoccupied slots, of transmitting the information on the broadcast control channel.

12. The method of claim 10 further comprising the step of inserting an identifier into the information being transmitted on the paging control channel to identify that the information belongs to the broadcast control channel.

13. The method of claim 12 further comprising the step of inserting the identifier into one of the unoccupied slots.

14. The method of claim 10 further comprising the step of continuously providing broadcast control channel information to the paging control channel, wherein the paging control channel ignores the broadcast control channel information if there is an insufficient number of unoccupied slots in the paging control channel to transmit the broadcast control channel information.

15. A method for transmitting information from a base station to a terminal in a cellular radio system, comprising the steps of defining a paging channel between the base station and the terminal for transmitting requests for the establishment of downlink connectors, which paging channel has a certain information transmission capacity, defining a broadcast channel for transmitting general information concerning the cell of the base station, and in a situation where the information transmission capacity of the paging channel is higher than the total amount of information which is to be transmitted concerning requests to establish downlink connections, transmitting general information concerning the cell of the base station on the. paging channel, the general information concerning the cell of the base station being in the otherwise unoccupied parts of the requests for the establishment of downlink connections, the requests being transmitted on the paging channel.

16. A method for transmitting information from a base station to a terminal in a cellular radio system, comprising the steps of defining a paging channel between the base station and the terminal for transmitting requests for the establishment of downlink connectors, which paging channel has a certain information transmission capacity, defining a broadcast channel for transmitting general information concerning the cell of the base station, and in a situation where the information transmission capacity of the paging channel is higher than the total amount of information which is to be transmitted concerning request to establish downlink connections, transmitting general information concerning the cell of the base station on the paging channel in other messages that are transmitted on the paging channel in addition to the requests for the establishment of downlink connections.

17. A terminal of a cellular system, comprising means for receiving requests for establishing downlink connections on a paging channel having a certain information transmission capacity;

means for receiving information concerning a cell of a base station on a broadcasting control channel;

means for receiving general information concerning the cell of the base station on the paging channel; and a control block and means for receiving information on the paging channel at predetermined intervals, wherein the control block is arranged to check whether a period longer than a certain predetermined time has passed since information concerning the cell of the base station was received during a previous time on the paging channel; and if not, to temporarily prevent reception of information on the broadcasting control channel.

18. The method of claim 1 wherein it is compulsory that the broadcast channel be in use while the paging channel is in use.

19. The method of claim 1 wherein the broadcast channel is always existing and transmitting general information concerning the cell of the base station when the paging channel is transmitting general information concerning the base station's cell.

20. The method of claim 1 wherein it is compulsory that information is being transmitted on the broadcast control channel while additionally transmitting general information concerning the base station's cell on the paging channel.

21. The base station of claim 7 wherein information concerning the base station cell is being transmitted on the paging channel only when information concerning the base station's cell is being substantially simultaneously transmitted on the broadcast control channel.

22. The base station of claim 7 wherein it is compulsory for general information concerning the base station's cell to be transmitted over the broadcast control channel substantially simultaneously with general information concerning the base station's cell being transmitted on the paging channel.

23. The terminal of claim 8 wherein information concerning the base station's cell is being received on the paging channel only when information concerning the base station's cell is being substantially simultaneously received on the broadcast control channel.

24. The terminal of claim 8 wherein it is compulsory that the broadcast control channel be receiving information at the same time the paging channel is receiving information.

* * * * *